(12) United States Patent
Wang (10) Patent No.: US 12,217,334 B2
(45) Date of Patent: Feb. 4, 2025

(54) OBJECT RENDERING BASED ON COLOR SUPERIMPOSING

(71) Applicant: Beijing Zitiao Network Technology Co., Ltd., Beijing (CN)

(72) Inventor: Xiaolu Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/538,798

(22) Filed: Dec. 13, 2023

(65) Prior Publication Data

US 2024/0112378 A1    Apr. 4, 2024

Related U.S. Application Data

(63) Continuation of application No. PCT/CN2022/118082, filed on Sep. 9, 2022.

(30) Foreign Application Priority Data

Sep. 18, 2021   (CN) .......................... 202111101358.X (51) Int. Cl.
*G06T 7/90* (2017.01)
*G06T 7/60* (2017.01)
*G06T 7/70* (2017.01)
*G06T 11/00* (2006.01)

(52) U.S. Cl.
CPC .............. *G06T 11/001* (2013.01); *G06T 7/60* (2013.01); *G06T 7/70* (2017.01); *G06T 7/90* (2017.01); *G06T 2207/10024* (2013.01); *G06T 2210/62* (2013.01)

(58) Field of Classification Search
CPC . G06F 9/451; G06T 11/00; G06T 7/90; G06T 11/001; G06T 2207/10024; G06T 2210/62
See application file for complete search history.

(56) References Cited

U.S. PATENT DOCUMENTS

| 2009/0169099 | A1 | 7/2009 | Ozdemir et al. |
| 2017/0213363 | A1 | 7/2017 | Furches et al. |

FOREIGN PATENT DOCUMENTS

| CN | 106406504 | A | * | 2/2017 |
| CN | 112069341 | A | | 12/2020 |
| CN | 112330763 | A | | 2/2021 |
| CN | 112988314 | A | | 6/2021 |
| CN | 113051872 | A | * | 6/2021 |
| CN | 113204658 | A | | 8/2021 |

(Continued)

OTHER PUBLICATIONS

European Search Report for EP Patent Application No. 22869136.6, Issued on Sep. 16, 2024, 11 pages.

(Continued)

*Primary Examiner* — Weiming He (57) ABSTRACT

There are disclosed a method, apparatus, electronic device, and medium for rendering. The method for rendering comprises: determining colors of predetermined areas on a target object, the number of predetermined areas being at least a predetermined number, which is greater than 1; determining a target color superimposed to a target position according to the color of each predetermined area; superimposing the target color at the target position.

15 Claims, 6 Drawing Sheets

(56) References Cited

FOREIGN PATENT DOCUMENTS

CN 113238829 A 8/2021
EP 3201879 B1 7/2018

OTHER PUBLICATIONS

Office action received from Japanese patent application No. 2023-577213 mailed on Sep. 17, 2024, 10 pages (5 pages English Translation and 5 pages Original Copy).
Wang et al., "Color Design for Illustrative Visualization", IEEE, vol. 14, No. 6, Dec. 2008, pp. 1-8.

* cited by examiner

OBJECT RENDERING BASED ON COLOR SUPERIMPOSING

This application is a continuation of International Patent Application No. PCT/CN2022/118082, filed on Sep. 9, 2022, which claims priority to Chinese Application No. 202111101358.X entitled "METHOD, APPARATUS, ELECTRONIC DEVICE AND MEDIUM FOR RENDERING" filed with the Chinese Patent Office on Sep. 18, 2021, the disclosures of which are incorporated herein by reference in their entities.

FIELD

The present disclosure relates to the field of computer technology, and in particular, to a method, apparatus, electronic device and medium for rendering.

BACKGROUND

Human-computer interaction or human-machine interaction is the study of the interaction between systems and users. Human-computer interaction can be realized through human-computer interfaces. Human-computer interfaces, also known as user interfaces, are media and dialogue interfaces for transmitting and exchanging information between humans and computers and form an important part of computer systems. They are the medium for interaction and information exchange between systems and users, achieving the conversion between the internal form of information and the form that humans can accept. Human-computer interfaces exist in all fields that participate in human-computer information exchange.

In order to improve the human-computer interaction experience from the visual effect perspective, the atmosphere of target objects displayed in the human-computer interface (such as images, software, videos, etc.) can be enhanced. Currently, a method of enhancing the atmosphere are to select the color with the largest area in the target object as the main color and then extend the main color to the background. However, this solution has a technical problem that if the main color is incorrectly selected, the rendering result will be disharmonious.

SUMMARY

Embodiments of the present disclosure provide a method, apparatus, electronic device and medium for rendering, which enhance the rendering effect and improve the visual experience of users.

The present disclosure provides a method for rendering, comprising:
  determining colors of predetermined areas on a target object, the number of the predetermined areas being at least a predetermined number, which is greater than 1;
  determining a target color to be superimposed to a target position according to a color of each predetermined area;
  superimposing the target color at the target position to achieve rendering.

The present disclosure further provides a apparatus for rendering, comprising:
  a determining module, configured for determining colors of predetermined areas on a target object, the number of the predetermined areas being at least a predetermined number, which is greater than 1;
  a target color determining module, configured for determining a target color to be superimposed to a target position according to a color of each predetermined area;
  a target color superimposing module, configured for superimposing the target color at the target position to achieve rendering.

The present disclosure further provides an electronic device, comprising:
  one or more processing means;
  storage means, configured for storing one or more programs;
  the one or more programs, when executed by the one or more processing means, causing the one or more processing means to perform the rendering method described above.

The present disclosure further provides a computer-readable medium, on which a computer program is stored, the program, when executed by processing means, performing the rendering method described above.

DETAILED DESCRIPTION

The embodiments of the present disclosure will be described in more detail below with reference to the accompanying drawings. Although certain embodiments of the present disclosure are shown in the accompanying drawings, the present disclosure can be implemented in various forms, and these embodiments are provided for the purpose of understanding the present disclosure. The accompanying drawings and embodiments disclosed herein are for illustrative purposes only.

It should be understood that various steps described in method implementations of the present disclosure may be performed in a different order and/or in parallel. In addition, the method implementations may comprise an additional step and/or omit a step which is shown. The scope of the present disclosure is not limited in this regard.

The term "comprise" and its variants used here are to be read as open terms that mean "include, but is not limited to". The term "based on" is to be read as "based at least in part on". The term "one embodiment" are to be read as "at least one embodiment". The term "another embodiment" is to be read as "at least one other embodiment". The term "some embodiments" are to be read as "at least some embodiments". Other definitions will be presented in the description below.

Note that the concepts "first", "second" and so on mentioned in the present disclosure are only for differentiating different apparatuses, modules or units rather than limiting the order or mutual dependency of functions performed by these apparatuses, modules or units.

Note that the modifications "one" and "a plurality" mentioned in the present disclosure are illustrative rather than limiting, and those skilled in the art should understand that unless otherwise specified, they should be understood as "one or more".

Names of messages or information rendered between a plurality of apparatuses in the implementations of the present disclosure are merely for the illustration purpose, rather than limiting the scope of these messages or information.

In the following embodiments, optional features and examples are provided simultaneously, and multiple features recorded in the embodiments can be combined to form multiple optional solutions. Each numbered embodiment should not be considered as only one technical solution.

First Embodiment

Figure 1:
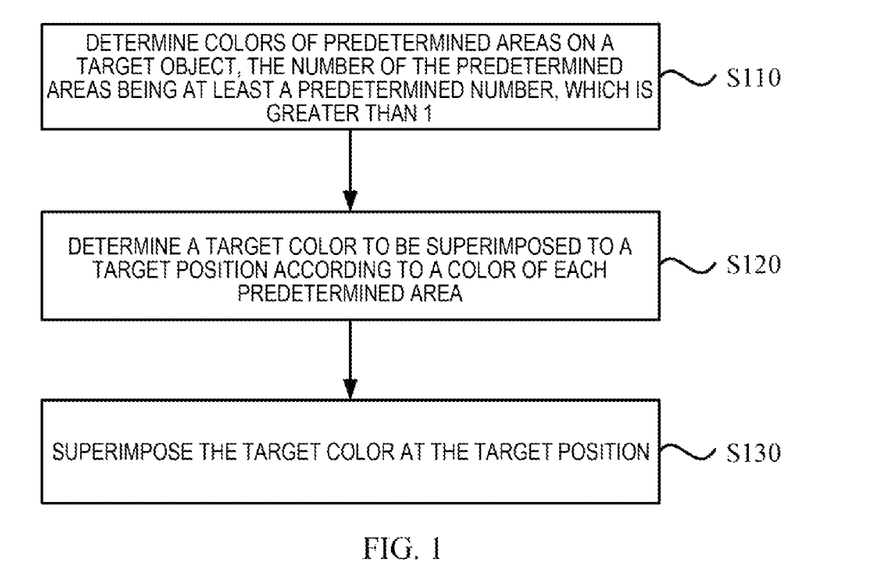
FIG. 1 is a schematic flowchart of a method for rendering provided in a first embodiment of the present disclosure.

FIG. 1 shows a schematic flowchart of a method for rendering according to a first embodiment of the present disclosure. The method may be applied to enhance the atmosphere of a target object, which may be performed by a rendering apparatus. The apparatus may be implemented by software and/or hardware, and generally integrated on an electronic device. In this embodiment, the electronic device includes but not limited to: a mobile phone, a personal digital assistant, a computer and other devices.

As shown in FIG. 1, the rendering method provided in the first embodiment of the present disclosure comprises:

S110: determining colors of predetermined areas on a target object, the number of predetermined areas being at least a predetermined number, which is greater than 1.

The target object can be considered as an object displayed in the human-machine interface, and is not limited here, so long as it is a target object that can create an atmosphere. As an example, the target object can be an image, a video, software, etc.

As an example, this embodiment can enhance the atmosphere of the target object by picking color from the target object to render it on the background where the target object is located, and can also improve the readability of the text by picking color from the target object to render it on the lower level of a text area of the target object.

The predetermined area can be an area formed by predetermined pixel points on the target object. The number of predetermined areas is at least the predetermined number, greater than 1. The predetermined number can be pre-configured by the user or automatically set by the system, and the predetermined number can be 4, 5, 6, etc.

As an example, the various predetermined areas can be selected from areas around the image (such as edges), e.g., the predetermined area may comprise endpoints or midpoints of edges around the target object.

This embodiment is not intended to limit the predetermined area, and different rendering positions and different dimensions of the target object can correspond to different predetermined areas.

As an example, when rendering the background of the target object, each predetermined area may comprise a predetermined number of pixel points at the edge of the target object. Taking an image as an example of the target object, the predetermined areas may comprise pixels at the four vertices of the image; the predetermined areas may also be square areas at the four corners of the image, each of which may comprise a plurality of pixels; in addition, the predetermined areas may also comprise one or more pixels at the midpoint of the long side of the image.

As an example, when rendering the target object to improve the readability of the text on the target object, the method of selecting the predetermined area can be the same as the method when rendering the background. The predetermined area can also be selected from the intersection of text and images, and this embodiment is not intended to limit the specific position of the predetermined area. The method of determining the text on the image is also not limited here. The text on the image which needs to be adjusted for the atmosphere may be determined after semantic analysis of the text on the image.

In this embodiment, when the color of the predetermined area is determined, it may be determined based on the number of pixels included in the predetermined area. When the predetermined area only includes one pixel, the color of that pixel can be determined as the color of the predetermined area. When the predetermined area includes a plurality of pixels, the color of the predetermined area may be determined after analyzing and processing the color of each pixel, which is not limited here. For example, the main color of various colors can be selected as the color of the predetermined area, or any color can be selected as the color of the predetermined area. Further, the color corresponding to the average RGB value of various colors can be determined as the color of the predetermined area.

The predetermined areas of different target objects can be located at different positions. In this embodiment, the predetermined area can be determined according to the dimension of the target object, and then the color of the predetermined area can be determined.

The method of determining the dimension of the target object is not limited here. After determining the dimension of the target object, the required predetermined area can be determined on the image according to the dimension of the target object. For example, when determining the position of the predetermined area according to the dimension of the target object, more predetermined areas can be selected in the direction of the longer side of the target object. Taking an image as an example of the target object, the number of predetermined areas selected on the long side of the image can be greater than the number of predetermined areas selected on the short side of the image.

S120: determining a target color superimposed to a target position according to the color of each predetermined area.

In this embodiment, the target position can be determined based on the content to be rendered, where the target position is not limited here. If the background of the target object is to be rendered, the target position can be a layer between the level where the target object is located and the level where the background of the target object is located. If the target object is to be rendered, the target position can be a layer between the level where the target object is located and the level where the text on the image is located.

Taking an image as an example of the target object, the target position can be an additional layer between the level where the image is located and the level where the background of the image is located, or the target position can also be an additional layer between the level where the image is located and the level where the text on the image is located. The number of layers added can be either 1 or 2, which is not limited in the embodiments of the present disclosure.

Figure 1A:
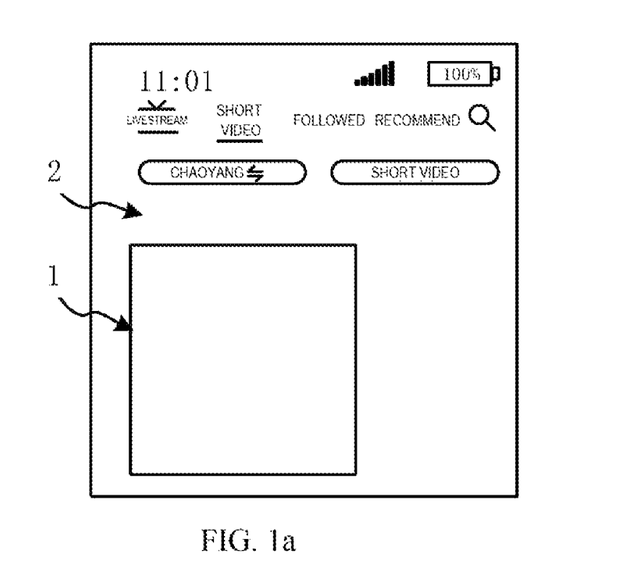
FIG. 1a is a schematic diagram of a display interface of an image provided in the first embodiment of the present disclosure.
Figure 1B:
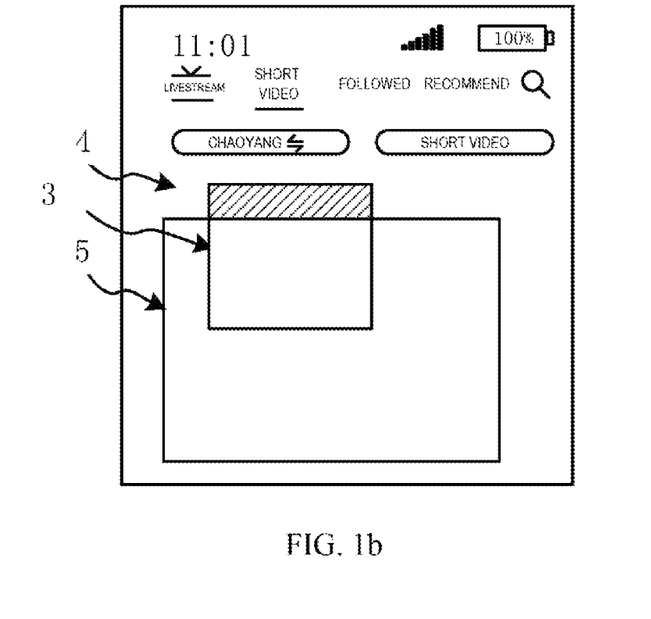
FIG. 1b is a schematic diagram of a further display interface of an image provided in the first embodiment of the present disclosure.

In an embodiment, the target object is an image, and the target position comprises: a layer added between the level where the image is located and the level where the background of the image is located, and the predetermined area is an area on the image located in the background; or, the target position is a layer added between the level where the image is located and the level where the text on the image is located. The image can be in the background in its entirety or in part. As an example, a pop-up window or panel is displayed in the background, and part of the image is displayed in the background and part of it is displayed in the panel. FIG. 1a is a schematic diagram of the display interface of an image provided in the first embodiment of the present disclosure. Refer to FIG. 1a, where the entirety of an image 1 is displayed in a background 2. FIG. 1b is a schematic diagram of the display interface of a further image provided in the first embodiment of the present disclosure. Refer to FIG. 1b, where part of an image 3 is displayed in a background 4 and part is displayed in a panel 5.

When the entirety of an image is displayed in the background, the image in the background can be considered as the full image.

When part of the image is displayed in the background, the image in the background can be only displayed in the background, but not on other controls, panels, or pop-ups on the background, as shown in the shaded part of the image 3 in FIG. 1b.

According to the color of each predetermined area, determining the target color superimposed to the target position may comprise: superimposing colors of the plurality of predetermined areas on white with a set opacity, and then adjusting the saturation and brightness of the superimposed colors in the hue-saturation-brightness (Hues-Saturation-Brightness, HSB) mode to obtain an adjusted color, and finally using the adjusted color as the target color.

For example, as an implementation, determining the target color superimposed to the target position according to the color of each predetermined area may be: superimposing the color of each predetermined area with a first opacity on white to obtain a first color; adjusting the saturation of the first color to a saturation threshold range, adjusting the brightness of the first color after adjusting the saturation to a brightness threshold range to obtain a first target color, and the target color comprising the first target color.

A value of the first opacity is not limited. For example, the first opacity can be 20% or 30% opacity. The first color can refer to a color obtained by superimposing the color of each predetermined area with the first opacity on white. The first target color can refer to a color obtained by adjusting the saturation of the first color to the set saturation threshold range and adjusting the brightness to the set brightness threshold range. The saturation threshold range can be considered as a critical value of saturation, and the brightness threshold range can be considered as a critical value of brightness. They can be pre-configured by relevant configuration personnel or automatically set by the system. It is not intended to limit the saturation threshold range and the brightness threshold range in this embodiment. For example, the saturation threshold range can be (20 60), and the brightness threshold range can be the saturation threshold range (30 60) brightness threshold range.

As a further implementation, determining the target color superimposed to the target position according to the color of each predetermined area can further comprise the following on the basis of the first implementation:

superimposing the color of each predetermined area on white with a second opacity to obtain a second color; adjusting the saturation of the second color to the saturation threshold range, and adjusting the brightness of the second color after adjusting the saturation to the brightness threshold range to obtain a second target color, the target color comprising the first target color and the second target color.

The second opacity is greater than the first opacity, the difference between the second opacity and the first opacity is a set value, and the second opacity is less than or equal to the first value, the first opacity is greater than or equal to the second value, and the first value is greater than the second value.

In this embodiment, the values of the first opacity and the second opacity are not limited. The second opacity can be 30%, the first opacity can be 20%, the first value can be 60%, and the second value can be 10%, and the set value can be 10%.

The second color refers to a color obtained by superimposing the color of each predetermined area on white with a second opacity, and the second target color refers to a color obtained by adjusting the saturation of the second color to the set saturation threshold range and adjusting the brightness to the set brightness threshold range.

The first and second opacity, the first and second numerical values, the first and second colors, the first and second target colors are only used to distinguish different objects and are not actually limited.

After determining the first target color and the second target color, the first target color and the second target color can be superimposed on different levels of the target position.

S130: superimposing the target color at the target position to achieve rendering.

The target color of the target position can be obtained through the above S120. In this embodiment, rendering is achieved by superimposing the target color with different transparency to the target position.

The layer of the target position can be divided into different areas, and the target color can be superimposed with different transparency for different areas to achieve rendering.

The layer of the target position can be divided into Area 1, Area 2, and Area 3. The target color is superimposed with Opacity 1, Opacity 2, and Opacity 3 for Area 1, Area 2, and Area 3, respectively, to achieve rendering. Opacity 1, Opacity 2, and Opacity 3 can represent different opacity. The opacity within an area can be unique or different. For example, the size of the opacity within an area can be variable, and the way of variation is not limited.

For example, when the target position is a layer added between the level where the image is located and the level where the background of the image is located, the number of layers added can be two, and the target color comprises the first target color and the second target color. First, each layer is divided into areas, including: a first area from the top of the background to the top of the image (such as Area 1), a second area from the top of the image to the center axis of the image (such as Area 2), and a third area from the center axis of the image to the bottom of the image (such as Area 3).

Then, for each layer, the target color is superimposed with different transparency for different areas. The step of superimposing can be as below:

In the two layers, the second target color of the third opacity is superimposed on the first area and the second area corresponding to the bottom layer; the second target color is superimposed on the third area corresponding to the bottom layer, the opacity of the second target color gradually changes from fourth opacity to third opacity from the bottom of the image to the center axis of the image in the third area corresponding to the bottom layer, and the fourth opacity is smaller than the third opacity; wherein the third opacity and the fourth opacity are only used to distinguish different objects and are not actually limited. The gradual change from the fourth opacity to the third opacity can be a gradual increase from the fourth opacity to the third opacity with a fixed opacity magnitude starting from the fourth opacity, or can be a gradual increase from the fourth opacity to the third opacity with a sequential increase in magnitude starting from the four opacity.

For example, if the fourth opacity is 0% and the third opacity is 75%, the opacity in the third area gradually increases from 0% to 75%. The magnitude of each increase is not limited. It can be fixed such as 1%, or can be a sequential increase such as 1%, 2%, 3% . . . , and the magnitude of each increase is not limited.

In the two layers, the first target color gradually changing from fifth opacity to sixth opacity is superimposed from the top of the background of the first area corresponding to the top layer to the top of the image. The fifth opacity is greater than the sixth opacity. The first target color of the sixth opacity is superimposed on the second area and the third area corresponding to the top layer. The fifth opacity and the sixth opacity are only used to distinguish different objects and are not actually limited. The fifth opacity can be 75%, and the sixth opacity can be 0%, which is not limited here.

For example, when the target position is a layer added between the level where the image is located and the level where the text on the image is located, the added layer can be 1 layer, and the target color includes the first target color. First, the layer is divided into areas, which can comprise: dividing the layer into a fifth area from the bottom of the text part to the top of the text part (or from the top of the text part to the bottom of the image) and a fourth area in the image except for the fifth region; then, superimposing the target color of different opacity on the fourth area and the fifth area. The step of superimposing can be as follows: superimposing the first target color of seventh opacity on the fourth area, superimposing the first target color on the fifth area, and the opacity of the first target color gradually changing from eighth opacity to ninth opacity from the bottom of the text to the top of the text in the fifth area. Wherein, the eighth opacity is less than the ninth opacity, and the seventh opacity, the eighth opacity, and the ninth opacity are only used to distinguish different objects and are not actually limited. The ninth opacity can be equal to the seventh opacity, the seventh opacity may be 75%, and the eighth opacity may be 0%.

This embodiment does not limit the setting of the opacity of the target color in each area, which can be any value or a non-fixed value. For example, the opacity of an area is not a fixed value, and the value of the opacity can be gradually changed to finally render a soft atmosphere.

A method for rendering is provided in the first embodiment of the present disclosure, the method comprising: determining color of predetermined areas on a target object, the number of predetermined areas being at least a predetermined number, the predetermined number being greater than 1; determining a target color to be superimposed to a target position according to the color of each predetermined area; superimposing the target color at the target position to achieve rendering. With the method, the target color superimposed to the target position is determined according to the colors of a plurality of predetermined areas on the target object, so as to achieve rendering, enhance the rendering effect and improve the visual effect of users.

Second Embodiment

Figure 2:
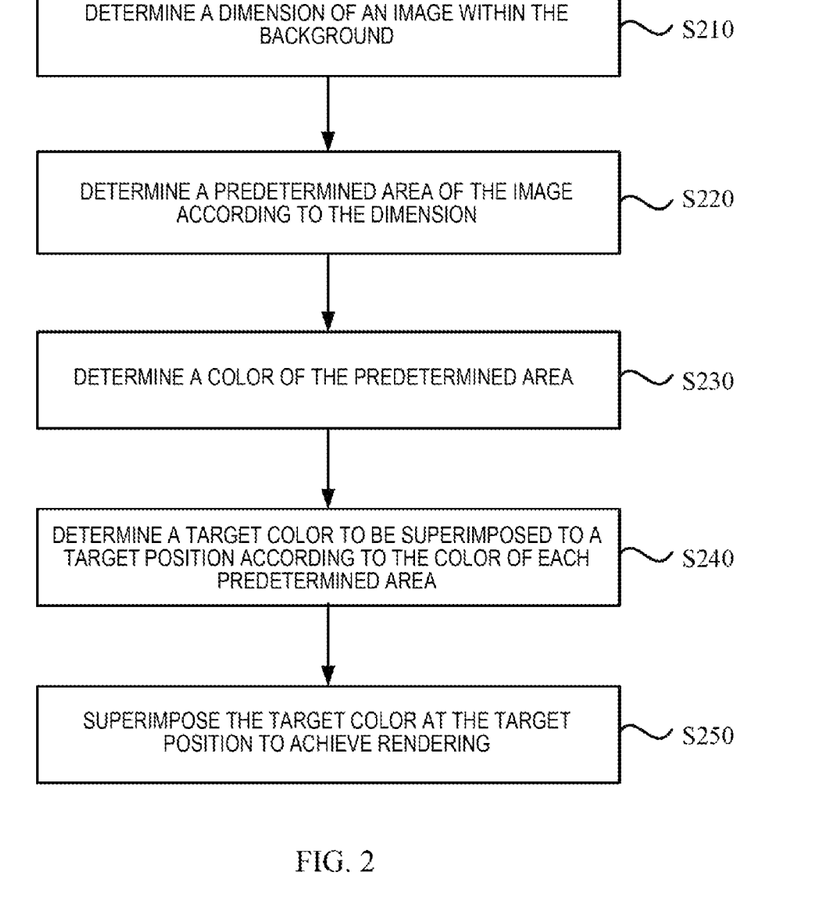
FIG. 2 is a schematic diagram of a rendering method provided in a second embodiment of the present disclosure.

FIG. 2 is a schematic flowchart of a rendering method provided in a second embodiment of the present disclosure. This embodiment is explained on the basis of the solution in the above embodiment. In this embodiment, determining the color of the predetermined area on the target object comprises: determining a dimension of the image in the background; determining the predetermined area of the image according to the dimension; determining the color of the predetermined area.

For details not yet detailed in this embodiment, please refer to the first embodiment.

As shown in FIG. 2, a rendering method provided in the second embodiment of the present disclosure comprises:

S210: determining a dimension of the image in the background.

The dimension of the image in the background is determined and used for subsequently determining the predetermined area of the image.

S220: determining the predetermined area of the image according to the dimension.

According to the dimension, long and short sides of the image can be obtained by comparing the lengths of sides on the image, and a certain number of predetermined areas can be selected on the long and short sides, respectively, wherein the number of predetermined areas selected on the long side is greater than the number of predetermined areas selected on the short side, and a sum of the number of predetermined areas selected on the long side and the number of predetermined areas selected on the short side is at least equal to the predetermined number.

In an embodiment, determining the predetermined area of the image according to the dimension comprises:

When the dimension characterizes that the length of a first side is greater than the length of a second side of the image, selecting a first number of predetermined areas on the first side; selecting a second number of predetermined areas on the second side, the first number being greater than the second number, a sum of the first and second numbers being at least the predetermined number. The predetermined number can be six.

The first side can represent the longest side of all sides in the image, the first number referring to the number of predetermined areas selected on the first side; the second side can represent the shortest side of all sides in the image, the second number referring to the number of predetermined areas selected on the second side. The first number is greater than the second number, and a sum of the first number and the second number is at least the predetermined number. The predetermined number can be pre-configured by relevant configuration personnel or automatically set by the system, for example, the predetermined number can be 4, 5, 6, etc.;

the first and second sides, the first and second numbers are only used to distinguish different objects and are not actually limited.

Figure 2A:
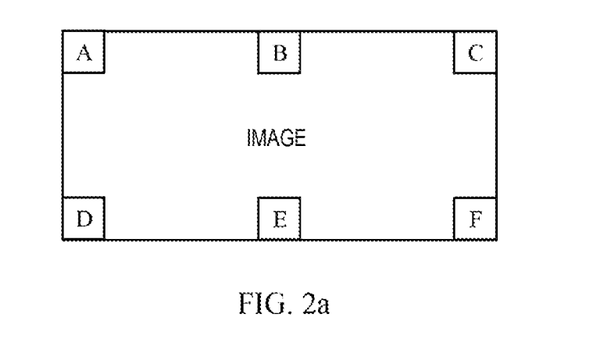
FIG. 2a is a schematic diagram of determining a predetermined area of the image provided in the second embodiment of the present disclosure.

As an example, FIG. 2a is a schematic diagram of determining predetermined areas of the image provided in the second embodiment of the present disclosure. As shown in FIG. 2a, the two longest sides, namely two first sides and two short sides, namely the two shortest sides of the image can be obtained according to the dimension of the image. When the predetermined is 6, four predetermined areas A, C, D, and F can be respectively taken at the four vertices of the image, and then two predetermined areas B and E can be respectively taken at the midpoints of the two longest sides, thereby determining the predetermined areas of the image according to the dimension. For example, six 1-pixel (px) colors can be selected at the edge of the image to obtain 6 colors. When the color superimposed at the six pixel points on the edge is no color (i.e., the three values in Red-Green-Blue (RGB) are equal, and the color is represented as black, white, or gray), the color with the largest area in the image can be selected as the main color. The predetermined areas can be square areas; each area includes a plurality of pixels, and the main color of the plurality of pixels can be taken as the color of the area. For example, each area may include 9 pixel grids, e.g. 3*3 pixel grids.

S230: determining the color of the predetermined area.

A plurality of predetermined areas can be obtained through the above S220, and for each predetermined area, the color of the predetermined area can be determined.

The implementation steps of determining the color of the predetermined area for each predetermined area are presented in S2301 to S2305 in this embodiment.

S2301: for each predetermined area, determining whether the predetermined area comprises only one pixel; if the predetermined area comprises only one pixel, performing S2302; if the predetermined area comprises a plurality of pixels, performing S2303.

First, for each predetermined area, the number of pixels in the predetermined area can be determined, and then the color of the current predetermined area can be determined based on the number of pixels.

When the predetermined area comprises only one pixel, it can be considered that there is only one color in the predetermined area, and the color of this pixel can be determined as a current predetermined area color of the predetermined area. When the predetermined area comprises more than one pixel, it can be considered that the predetermined area contains at least two pixels, and the main color of a plurality of pixels is used as a current predetermined area color of the predetermined area.

S2302: determining the color of the pixel as the color of the current predetermined area, and ending the operation.

S2303: determining the main color of a plurality of pixels as the color of the current predetermined area.

The current predetermined area can be considered as a predetermined area with the current determined color.

If the color obtained by superimposing the colors of all predetermined areas is no color, i.e., the three values of the RGB values of the superimposed color are equal, then the color of each predetermined area needs to be updated. The following steps S2304 to S2307 are for updating the color of each predetermined area.

S2304: superimposing the colors of all predetermined areas and calculating RBG values of the superimposed color.

The colors of all predetermined areas can be superimposed to obtain the superimposed color, and then the RBG values of the superimposed color are calculated. The RBG values are used for characterizing the state of the superimposed color, and the color of each predetermined area is determined based on the RBG values.

S2305: determining whether three values in the RBG values of the superimposed color are equal; if the three values in the RBG values of the superimposed color are equal, performing S2306; if the three values in the RBG values of the superimposed color are not equal, performing the step of determining the target color superimposed to the target position according to the color of each predetermined area.

The RBG values of the superimposed color can be obtained through the above S2304. By comparing the sizes of the three values in the RBG values of the superimposed color, it can be determined whether the three values in the RBG values are equal. If the three numerical values in the RBG values are equal, it means that there is no color after the colors of all predetermined areas are superimposed. At this time, the main color of the target object needs to be selected as the color of each predetermined area, that is, the color of the predetermined area is updated based on the main color of the target object. If the three numerical values in the RBG values are not equal, it means that the colors of all predetermined areas are colored after superposition, and the color of the predetermined area is not updated at this time.

S2306: updating the main color of the target object as the color of each predetermined area.

This embodiment first determines the number of pixels in each predetermined area, determines the color of each predetermined area for different numbers of pixels, respectively, and then determines whether to adjust the color of each predetermined area by calculating the RGB values of the color formed by superimposing the colors of all predetermined areas. Thereby, the accuracy of determining the color of each predetermined area is increased, a more accurate target color can be determined, and better visual effects can be achieved after superimposition based on the target color.

S240: determining the target color superimposed on the target position based on the color of each predetermined area.

In an embodiment, determining the target color superimposed on the target position based on the color of each predetermined area comprises:

Superimposing the color of each predetermined area with first opacity on white to obtain a first color; adjusting the saturation of the first color to a saturation threshold range, and adjusting the brightness of the first color after adjusting the saturation to a brightness threshold range to obtain a first target color, the target color comprising the first target color.

In an embodiment, determining the target color superimposed on the target position based on the color of each predetermined area further comprises:

Superimposing the color of each predetermined area on white with second opacity to obtain a second color; adjusting the saturation of the second color to the saturation threshold range, and adjust the brightness of the second color after adjusting the saturation to the brightness threshold range to obtain a second target color, the target color comprising the second target color; wherein the second opacity is greater than the first opacity, the difference between the second opacity and the first opacity is a predetermined value, the second opacity is less than or equal to a first value, the first opacity is greater than or equal to a second value, and the first value is greater than or equal to the second value.

Figure 2B:
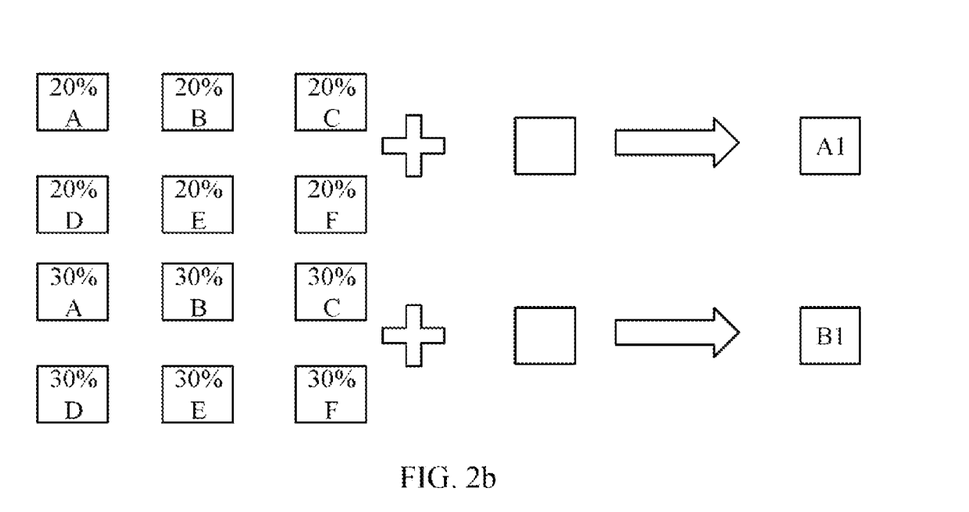
FIG. 2b is a schematic diagram of a process for obtaining a first color provided in the second embodiment of the present disclosure.

As an example, FIG. 2b is a schematic diagram of a process for obtaining the first color provided in the second embodiment of the present disclosure. As shown in FIG. 2b, if the colors A, B, C, D, E, and F of the 6 predetermined regions can be obtained in the above steps, the 6 colors are set with the opacity of 20% respectively, and are superimposed on 100% #FFFFFF to obtain color A1; the 6 colors are set with the opacity of 30% respectively, and are superimposed on 100% #FFFFFF to obtain color B1.

The difference between the opacity set when obtaining B1 (second color) and A1 (first color) can be 10%, and the opacity set when obtaining B1 is greater than that set when obtaining A1. The opacity of B1 is less than 60%, and the opacity of A1 is greater than 10%.

Figure 2C:
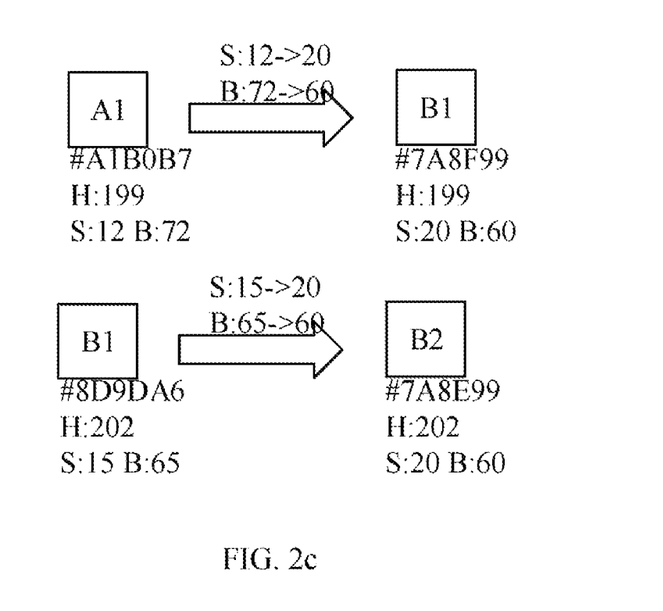
FIG. 2c is a schematic diagram of determining a target color superimposed to a target position provided in the second embodiment of the present disclosure.

FIG. 2c is a schematic diagram of determining the target color superimposed to the target position provided in the second embodiment of the present disclosure. As shown in FIG. 2c, the S value and B value of A1 are analyzed in HSB mode, and the S (i.e. saturation) value and B (i.e. brightness) value of A1 are adjusted to 20<S<60 (i.e. saturation threshold range) and 30<B<60 (i.e. brightness threshold range) to obtain color A2. The S value and B value of B1 are analyzed in HSB mode, and the S value and B value of B1 are adjusted to 20<S<60 (i.e. saturation threshold range) and 30<B<60 (i.e. brightness threshold range) to obtain color B2. The obtained A2, i.e. the first target color and B2, i.e. the second target color, are used as the target color superimposed to the target position. The present disclosure does not limit the adjustment means, as long as after adjustment, the saturation is within the saturation threshold range and the brightness is within the brightness threshold range.

The saturation threshold range corresponding to the first target color and the second target color can be the same or different, and the brightness threshold range corresponding to the first target color and the second target color can be the same or different. By limiting the saturation threshold range and the brightness threshold range, the rendered result can have a better visual experience.

S250: superimposing the target color at the target position to achieve rendering.

After determining the target color superimposed to the target location, the layer of the target position can be divided into different areas, and the target color can be superimposed with different transparency for different areas to achieve rendering.

For example, when the layer of the target position is 1 layer, the target color can be B2 or A2. Taking B2 as an example, for example, B2 with 75% opacity can be superimposed on Area 1, and B2 can be superimposed with the opacity gradually increasing from 0% to 75% by a magnitude of 5% from bottom to top in the corresponding Area 2 and Area 3; for example, B2 with 75% opacity can also be superimposed on Areas 1 and 2, and B2 can be superimposed with the fixed opacity increasing by 5% from 0% to 75% from bottom to top in Area 3.

Figure 2D:
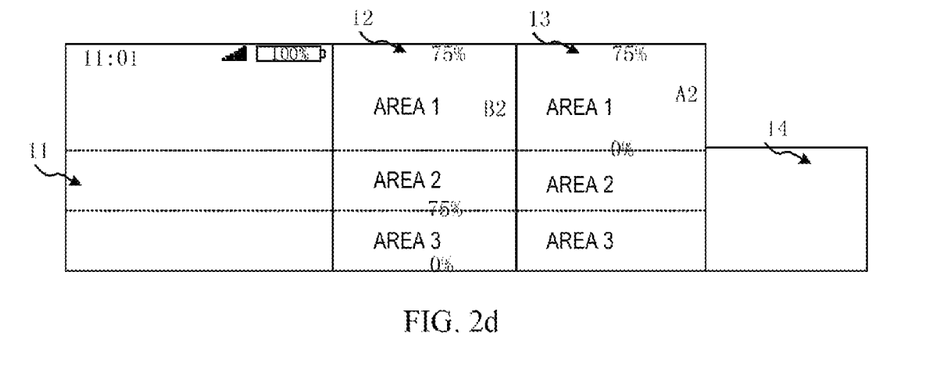
FIG. 2d is a schematic diagram of superimposing a target color to the background provided in the second embodiment of the present disclosure.

FIG. 2d is a schematic diagram of superimposing the target color to the background provided in the second embodiment of the present disclosure. With reference to FIG. 2d, when the layer of the target position is 2 layers, the target colors are A2 and B2. First, each layer is divided into areas, including: Area 1 from the top of the background to the top of the image, Area 2 from the top of the image to the center axis of the image, and Area 3 from the center axis of the image to the bottom of the image. Then in the two layers, B2 with the opacity of 75% is superimposed on Areas 1 and 2 corresponding to a bottom layer 12; B2 is superimposed on Area 3, and the opacity of B2 gradually changes from 0% to 75% with a fixed opacity of 5% from the bottom of the image to the center axis of the image in Area 3. In the two layers, A2 with the opacity gradually changing from 0% to 75% is superimposed from the top of the background to the top of the image in Area 1 corresponding to a top layer 13, and A2 with the opacity of 0% is superimposed on Areas 2 and 3.

The second target color can be B2, and the first target color can be A2.

B2 can be superimposed below the text in the image, and the opacity setting of B2 is not limited, which may be referred to to the setting method used in superimposition to the background. When superimposing B2 below the text area, the target position can be adapted to the entire image. The division method of the target position can be referred to the division method used when the target position is the layer added between the level where the image is located and the level where the background of the image is located.

For example, the first area is from the top of the image to the top of the text area, the second area is from the top of the text area to the center axis of the text area, and the third area is from the center axis of the text area to the bottom of the image area. When rendering each area, the second target color can be rendered to each area, and the setting of the opacity in each area can be referred to the setting method used when the target position is the layer added between the level where the image is located and the level where the background of the image is located.

In FIG. 2d, a background 11 is at the bottom, the bottom layer 12 in the two layers is above the background 11, the top layer 13 in the two layers is above the bottom layer 12, and an image 14 is above the top layer 13.

The present disclosure is not intended to limit the opacity of the target color in the first, second, and third regions, which can be any opacity.

The present disclosure achieves background color calculation by picking color from the predetermined area of the image and then computing the target color superimposed to the target position, which effectively enhances the atmosphere of the human-computer interface when displaying the image. This example achieves strong compatibility by picking color from a plurality of points on the edge of the image, computing color and adapting color to the interface.

In the present disclosure, by picking color from the edges of the image and then determining the target color, the rendering results may be enriched and can be compatible with dark and light color modes. In addition, the edge intersection of the image and background is made more harmonious and compatible with full-screen scenes.

After rendering different images using the method provided in the present disclosure, the effect of each image is different, achieving a rich and colorful rendering result.

In the present disclosure, images are made softer and more lively by superimposing two layers, i.e., gradient superimposition with two layers.

A rendering method is provided in the second embodiment of the present disclosure, the method comprising: determining a dimension of an image located in the background; determining a predetermined area of the image according to the dimension; determining a color of the predetermined area; determining a target color superimposed to a target position according to the color of each predetermined area; superimposing the target color at the target position to achieve rendering. With the method, the corresponding predetermined area is selected adaptively according to the dimension of the target object, and then the color of the predetermined area is determined. Thereby, the accuracy of determining the target color is increased, the rendering effect is enhanced, and the visual experience of users is improved.

Third Embodiment

Figure 3:
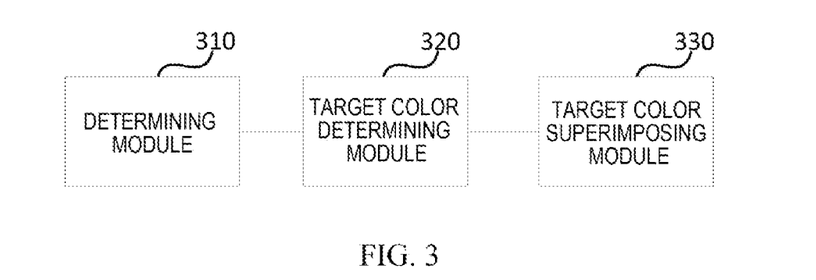
FIG. 3 is a schematic structural diagram of a rendering apparatus provided in a third embodiment of the present disclosure.

FIG. 3 is a schematic structural diagram of a rendering apparatus according to a third embodiment of the present disclosure. The apparatus may be applied to render an image, which apparatus may be implemented by software and/or hardware and is generally integrated on an electronic device.

As shown in FIG. 3, the apparatus comprises:
a determining module 310, configured for determining colors of predetermined areas on a target object, the number of the predetermined areas being at least a predetermined number, which is greater than 1; a target color determining module 320, configured for determining a target color to be superimposed to a target position according to a color of each predetermined area; a target color superimposing module 330, configured for superimposing the target color at the target position to achieve rendering.

An embodiment of the present disclosure provides a rendering apparatus. The apparatus determines the target color superimposed to the target position through the colors of a plurality of color predetermined area on the target object, so as to achieve rendering. Thereby, the rendering effect is enhanced, and the visual effect of users is improved.

In an embodiment, the target object is an image, and accordingly, the target position comprises: a layer added between the level where the image is located and the level where the background of the image is located, and the predetermined area is an area on an image within the background; or the target position is a layer added between the level where the image is located and the level where text on the image is located.

In an embodiment, the determining module 310 comprises:
a dimension determining unit, configured for determining a dimension of an image within the background; a predetermined area determining unit, configured for determining a predetermined area of the image according to the dimension; and a color determining unit, configured for determining a color of the predetermined area.

In an embodiment, the predetermined area determining unit is configured for:
when the dimension characterizes that the length of a first side of the image is greater than the length of a second side, selecting a first number of predetermined areas on the first side; selecting a second number of predetermined areas on the second side, the first number being greater than the second number, a sum of the first number and the second number being at least the predetermined number.

In an embodiment, the predetermined number is six, and the determining module 310 is configured for:
for each predetermined area, when the predetermined area includes one pixel, determining a color of the pixel as the color of the predetermined area; when the predetermined area includes at least two pixels, determining a main color of the at least two pixels as the color of the predetermined area; when three values of RBG values of a color formed by superimposing colors of all predetermined areas are equal, updating the color of each predetermined area as a main color of the target object.

In an embodiment, the target color determining module 320 comprises:
superimposing the color of each predetermined area with a first opacity on white to obtain a first color; adjusting the saturation of the first color to a saturation threshold range, and adjusting the brightness of the first color after adjusting the saturation to a brightness threshold range to obtain a first target color, the target color comprising the first target color.

In an embodiment, the target color determining module 320 further comprises:
superimposing the color of each predetermined area with a second opacity on white to obtain a second color; adjusting the saturation of the second color to the saturation threshold range, and adjusting the brightness of the second color after adjusting the saturation to the brightness threshold range to obtain a second target color, the target color comprising the second target color; wherein the second opacity is greater than the first opacity, the difference between the second opacity and the first opacity is a predetermined value, the second opacity is less than or equal to a first value, the first opacity is greater than or equal to a second value, and the first value is greater than the second value.

In an embodiment, the target color superimposing module 330 is configured for:
superimposing the target color with different transparency to the target position.

In an embodiment, the target color superimposing module 330 is configured for: superimposing the target color with different transparency to the target position, including:
when the target position is a layer added between the level where the image is located and the level where the background of the image is located, the number of layers added being two, and each layer added being divided into a first area from the top of the background to the top of the image, a second area from the top of the image to the center axis of the image, and a third area from the center axis of the image to the bottom of the image; in the two layers added, superimposing the second target color with a third opacity on the first and second areas corresponding to a bottom layer; superimposing the second target color on the third area corresponding to the bottom layer, the opacity of the second target color gradually changing from a fourth opacity to the third opacity from the bottom of the image to the center axis of the image in the third area corresponding to the bottom layer, the fourth opacity being less than the third opacity; in the two layers added, superimposing the first target color with an opacity gradually changing from a fifth opacity to a sixth opacity from the top of the background to the top of the image in the first area corresponding to a top layer, the fifth opacity being greater than the sixth opacity; superimposing the first target color with the sixth opacity in the second and third areas corresponding to the top layer.

The rendering apparatus can perform the rendering method provided in any embodiment of the present disclosure, with the corresponding functional modules and effects of the execution method.

Fourth Embodiment

Figure 4:
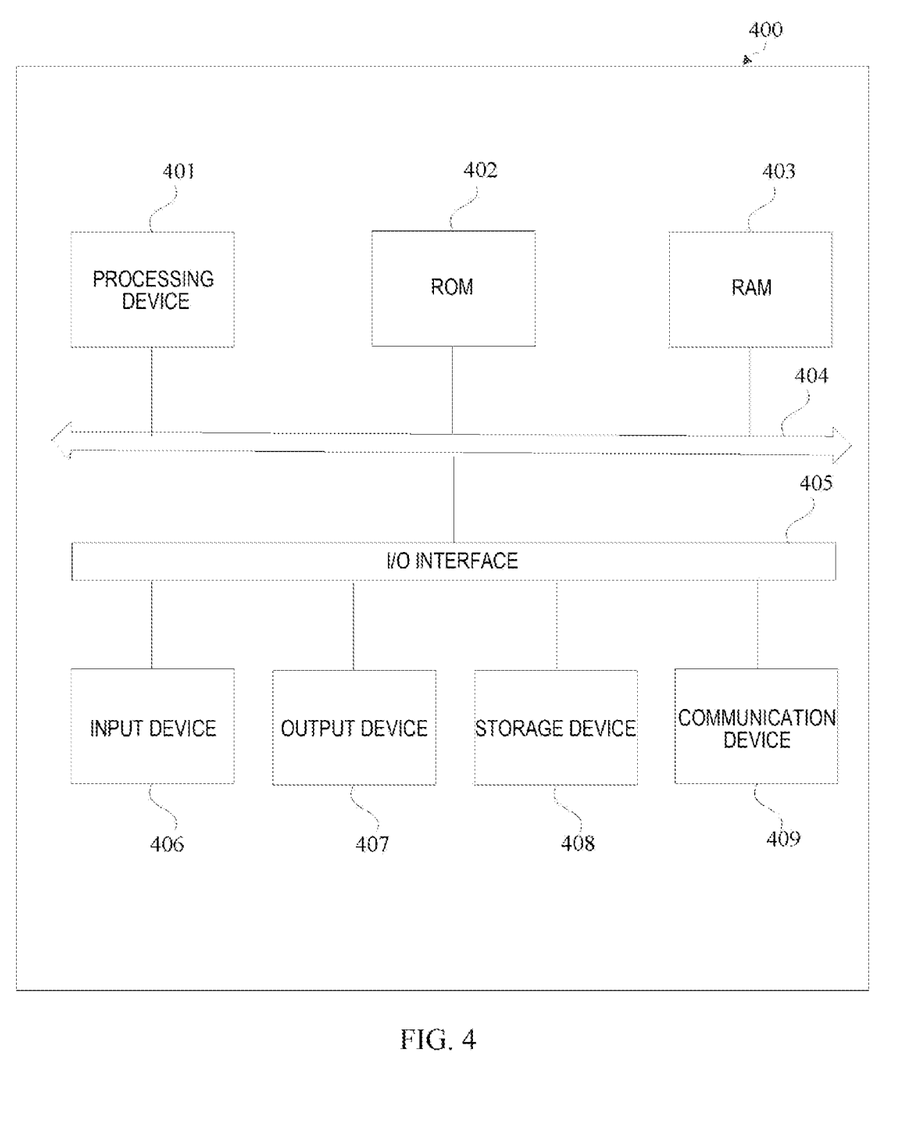
FIG. 4 is a schematic structural diagram of a rendering apparatus provided in a fourth embodiment of the present disclosure.

FIG. 4 is a schematic structural diagram of an electronic device provided in a fourth embodiment of the present disclosure. FIG. 4 shows a schematic structural diagram of an electronic device 400 suitable for implementing the embodiments of the present disclosure. The electronic device 400 in the embodiments of the present disclosure may include, without limitation to, a mobile terminal with an image capturing function, such as a mobile phone, a laptop computer, a digital broadcast receiver, a personal digital assistant (PDA), a portable android device (PAD), a portable multimedia player (PMP), an on-board terminal (e.g., on-board navigation terminal) and the like, as well as a fixed terminal, such as a digital television (TV), a desktop computer and the like. The electronic device 400 shown in FIG. 4 is merely an example and should not be construed to impose any limitations on the functionality and use scope of the embodiments of the present disclosure.

As shown in FIG. 4, the electronic device 400 may comprises one or more processing device (e.g., a central processor, a graphics processor) 401 which is capable of performing various appropriate actions and processes in accordance with programs stored in a read only memory (ROM) 402 or programs loaded from storage device 408 to a random access memory (RAM) 403. In the RAM 403, there are also stored various programs and data required by the electronic device 400 when operating. The processing device 401, the ROM 402 and the RAM 403 are connected to one another via a bus 404. An input/output (I/O) interface 405 is also connected to the bus 404.

Usually, the following device may be connected to the I/O interface 405: input device 406 including a touch screen, a touch pad, a keyboard, a mouse, a camera, a microphone, an accelerometers, a gyroscope, or the like; output device 407, such as a liquid-crystal display (LCD), a loudspeaker, a vibrator, or the like; storage device 408, such as a a magnetic tape, a hard disk or the like; and communication device 409. The communication device 409 allows the electronic device 400 to perform wireless or wired communication with other device so as to exchange data with other device. While FIG. 4 shows the electronic device 400 with various device, it should be understood that it is not required to implement or have all of the illustrated device. Alternatively, more or less device may be implemented or exist.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication device 409, or installed from the storage device 408, or installed from the ROM 402. The computer program, when executed by the processing device 401, perform the above functions defined in the method of the embodiments of the present disclosure.

The computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

In some implementations, the client and the server may communicate using any network protocol that is currently known or will be developed in future, such as the hyper text transfer protocol (HTTP) and the like, and may be interconnected with digital data communication (e.g., communication network) in any form or medium. Examples of communication networks include local area networks (LANs), wide area networks (WANs), inter-networks (e.g., the Internet) and end-to-end networks (e.g., ad hoc end-to-end networks), as well as any networks that are currently known or will be developed in future.

The above computer readable medium may be included in the above-mentioned electronic device 400; and it may also exist alone without being assembled into the electronic device 400.

The computer readable medium stores one or more computer programs which, when executed by the processing means, perform a method as below: determining colors of predetermined areas on a target object, the number of predetermined areas being at least a predetermined number, which is greater than 1; determining a target color superimposed to a target position according to the color of each predetermined area; and superimposing the target color at the target position.

The computer readable medium carries one or more programs, which, when executed by the electronic device, cause the electronic device 400 to write computer program codes for carrying out operations of the present disclosure in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules described in the embodiments of the present disclosure may be implemented as software or hardware. Herein the name of a module does not form any limitation to the module per se.

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, means or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

According to one ore more embodiments of the present disclosure, Example 1 provides a method for rendering an interface, comprising:
  determining colors of predetermined areas on a target object, the number of the predetermined areas being at least a predetermined number, which is greater than 1;
  determining a target color to be superimposed to a target position according to a color of each predetermined area;
  superimposing the target color at the target position to achieve rendering.

According to one ore more embodiments of the present disclosure, Example 2 provides a method according to Example 1,
  the target object is an image, and accordingly, the target position comprises: a layer added between a level where the image is located and a level where the background of the image is located, and the predetermined area is an area on an image within the background; or
  the target position is a layer added between a level where the image is located and a level where text on the image is located.

According to one ore more embodiments of the present disclosure, Example 3 provides a method according to Example 2,
  the determining colors of predetermined areas on a target object comprises:
  determining a dimension of the image within the background;
  determining a predetermined area of the image according to the dimension; and
  determining a color of the predetermined area.

According to one ore more embodiments of the present disclosure, Example 4 provides a method according to Example 3,
  the determining a predetermined area of the image according to the dimension comprises:
  when the dimension characterizes that the length of a first side of the image is greater than the length of a second side, selecting a first number of predetermined areas on the first side; selecting a second number of predetermined areas on the second side, the first number being greater than the second number, a sum of the first number and the second number being at least the predetermined number.

According to one ore more embodiments of the present disclosure, Example 5 provides a method according to Example 3,
  the predetermined number is six, and the determining a color of the predetermined area comprises:
  for each predetermined area, when the predetermined area includes one pixel, determining a color of the pixel as the color of the predetermined area; when the predetermined area includes at least two pixels, determining a main color of the at least two pixels as the color of the predetermined area;
  when three values of RBG (red, blue, green) values of a color formed by superimposes colors of all predetermined areas being equal, updating the color of each predetermined area as a main color of the target object.

According to one ore more embodiments of the present disclosure, Example 6 provides a method according to Example 2,
  the determining a target color superimposed to a target position according to a color of each predetermined area comprises:
  superimposing the color of each predetermined area with a first opacity on white to obtain a first color;
  adjusting a saturation of the first color to a saturation threshold range, and adjusting a brightness of the first color after adjusting the saturation to a brightness threshold range to obtain a first target color, the target color comprising the first target color.

According to one ore more embodiments of the present disclosure, Example 7 provides a method according to Example 6,
  superimposing the color of each predetermined area with a second opacity on white to obtain a second color;
  adjusting a saturation of the second color to the saturation threshold range, and adjusting a brightness of the second color after adjusting the saturation to the brightness threshold range to obtain a second target color, the target color comprising the second target color;

wherein the second opacity is greater than the first opacity, the difference between the second opacity and the first opacity is a predetermined value, the second opacity is less than or equal to a first value, the first opacity is greater than or equal to a second value, and the first value is greater than the second value.

According to one ore more embodiments of the present disclosure, Example 8 provides a method according to Example 7, the superimposing the target color at the target position to achieve rendering comprises:

superimposing the target color with different transparency to the target position.

According to one ore more embodiments of the present disclosure, Example 9 provides a method according to Example 8, the superimposing the target color with different transparency at the target position comprises:

when the target position is a layer added between the level where the image is located and the level where the background of the image is located, the number of layers added being two, and each layer added being divided into a first area from a top of the background to a top of the image, a second area from the top of the image to a center axis of the image, and a third area from the center axis of the image to the bottom of the image;

in the two layers added, superimposing the second target color with a third opacity on the first and second areas corresponding to a bottom layer; superimposing the second target color on the third area corresponding to the bottom layer, wherein the opacity of the second target color gradually changes from a fourth opacity to the third opacity from the bottom of the image to the center axis of the image in the third area corresponding to the bottom layer, the fourth opacity being less than the third opacity;

in the two layers added, superimposing the first target color with an opacity gradually changing from a fifth opacity to a sixth opacity from the top of the background to the top of the image in the first area corresponding to a top layer, the fifth opacity being greater than the sixth opacity, superimposing the first target color with the sixth opacity in the second and third areas corresponding to the top layer.

According to one ore more embodiments of the present disclosure, Example 10 provides an apparatus for rendering an interface, comprising:

a determining module, configured for determining colors of predetermined areas on a target object, the number of the predetermined areas being at least a predetermined number, which is greater than 1;

a target color determining module, configured for determining a target color superimposed to a target position according to a color of each predetermined area;

a target color superimposing module, configured for superimposing the target color at the target position to achieve rendering.

According to one ore more embodiments of the present disclosure, Example 11 provides an electronic device, comprising:

at least one processing means;

storage means, configured for storing at least one program;

the at least one program, when executed by the at least one processing means, causing the at least one processing means to perform a rendering method according to any of claims 1 to 9.

According to one ore more embodiments of the present disclosure, Example 11 provides a computer-readable medium, storing a computer program which, when executed by a processing means, performs a rendering method according to any of claims 1 to 9.

Furthermore, although multiple operations are depicted in a specific order, this should not be understood as requiring them to be executed in the specific order shown or in a sequential order. In certain environments, multitasks and parallel processing may be advantageous. Similarly, although multiple implementation details are included in the above discussion, these should not be interpreted as limiting the scope of this disclosure. Some features described in the context of individual embodiments can also be combined and implemented in a single embodiment. On the contrary, multiple features described in the context of a single embodiment can also be implemented individually or in any suitable sub combination in multiple embodiments.

I claim:

1. A method for rendering, comprising:

determining colors of a plurality of predetermined areas on a target object, the number of the predetermined areas being at least a predetermined number, which is greater than 1;

determining a target color to be superimposed to a target position according to a color of each predetermined area in the plurality of predetermined areas, comprising:

superimposing the color of each predetermined area with a first opacity on white to obtain a first color;

adjusting a saturation of the first color to a saturation threshold range, and adjusting a brightness of the first color after adjusting the saturation to a brightness threshold range to obtain the target color;

superimposing the color of each predetermined area with a second opacity on white to obtain a second color; and adjusting a saturation of the second color to the saturation threshold range, and adjusting a brightness of the second color after adjusting the saturation to the brightness threshold range to obtain the target color;

wherein the second opacity is greater than the first opacity, the difference between the second opacity and the first opacity is a predetermined value, the second opacity is less than or equal to a first value, the first opacity is greater than or equal to a second value, and the first value is greater than the second value; and superimposing the target color at the target position to achieve rendering.

2. The method according to claim 1, wherein the target object is an image, and the target position comprises: a layer added between a level where the image is located and a level where the background of the image is located, and the predetermined area is an area on an image within the background; or the target position is a layer added between a level where the image is located and a level where text on the image is located.

3. The method of claim 2, wherein the determining colors of predetermined areas on a target object comprises:

determining a dimension of the image within the background;

determining a predetermined area of the image according to the dimension; and determining a color of the predetermined area.

4. The method of claim 3, wherein the determining a predetermined area of the image according to the dimension comprises:

in response to the dimension characterizing that the length of a first side of the image is greater than the length of a second side, selecting a first number of predetermined areas on the first side; selecting a second number of predetermined areas on the second side, the first number being greater than the second number, a sum of the first number and the second number being at least the predetermined number.

5. The method according to claim 3, wherein the predetermined number is six, and the determining a color of the predetermined area comprises:

for each predetermined area, in response to the predetermined area including one pixel, determining a color of the pixel as the color of the predetermined area; in response to the predetermined area including at least two pixels, determining a main color of the at least two pixels as the color of the predetermined area; and in response to three values of RBG (red, blue, green) values of a color formed by superimposing colors of all predetermined areas being equal, updating the color of each predetermined area as a main color of the target object.

6. The method of claim 1, wherein the superimposing the target color at the target position to achieve rendering comprises:

superimposing the target color with different transparency to the target position.

7. The method of claim 6, wherein the superimposing the target color with different transparency at the target position comprises:

in response to the target position being a layer added between the level where the image is located and the level where the background of the image is located, the number of layers added being two, and each layer added being divided into a first area from a top of the background to a top of the image, a second area from the top of the image to a center axis of the image, and a third area from the center axis of the image to the bottom of the image;

in the two layers added, superimposing a second target color with a third opacity on the first and second areas corresponding to a bottom layer, the second target color being obtained by adjusting the saturation and the brightness of the second color; superimposing the second target color on the third area corresponding to the bottom layer, wherein the opacity of the second target color gradually changes from a fourth opacity to the third opacity from the bottom of the image to the center axis of the image in the third area corresponding to the bottom layer, the fourth opacity being less than the third opacity; and in the two layers added, superimposing a first target color with an opacity gradually changing from a fifth opacity to a sixth opacity from the top of the background to the top of the image in the first area corresponding to a top layer, the first target color being obtained by adjusting the saturation and the brightness of the first color, the fifth opacity being greater than the sixth opacity, superimposing the first target color with the sixth opacity in the second and third areas corresponding to the top layer.

8. An electronic device, comprising:

at least one processing unit;

a storage unit, configured for storing at least one program;

the at least one program, when executed by the at least one processing unit, causing the at least one processing unit to perform a method for rendering, the method comprises:

determining colors of a plurality of predetermined areas on a target object, the number of the predetermined areas being at least a predetermined number, which is greater than 1;

determining a target color to be superimposed to a target position according to a color of each predetermined area in the plurality of predetermined areas, comprising:

superimposing the color of each predetermined area with a first opacity on white to obtain a first color;

adjusting a saturation of the first color to a saturation threshold range, and adjusting a brightness of the first color after adjusting the saturation to a brightness threshold range to obtain the target color;

superimposing the color of each predetermined area with a second opacity on white to obtain a second color; and adjusting a saturation of the second color to the saturation threshold range, and adjusting a brightness of the second color after adjusting the saturation to the brightness threshold range to obtain the target color; wherein the second opacity is greater than the first opacity, the difference between the second opacity and the first opacity is a predetermined value, the second opacity is less than or equal to a first value, the first opacity is greater than or equal to a second value, and the first value is greater than the second value; and superimposing the target color at the target position to achieve rendering.

9. The device according to claim 8, wherein the target object is an image, and the target position comprises: a layer added between a level where the image is located and a level where the background of the image is located, and the predetermined area is an area on an image within the background; or the target position is a layer added between a level where the image is located and a level where text on the image is located.

10. The device of claim 9, wherein the determining colors of predetermined areas on a target object comprises:

determining a dimension of the image within the background;

determining a predetermined area of the image according to the dimension; and determining a color of the predetermined area.

11. The device of claim 10, wherein the determining a predetermined area of the image according to the dimension comprises:

in response to the dimension characterizing that the length of a first side of the image is greater than the length of a second side, selecting a first number of predetermined areas on the first side; selecting a second number of predetermined areas on the second side, the first number being greater than the second number, a sum of the first number and the second number being at least the predetermined number.

12. The device according to claim 10, wherein the predetermined number is six, and the determining a color of the predetermined area comprises:

for each predetermined area, in response to the predetermined area including one pixel, determining a color of the pixel as the color of the predetermined area; in response to the predetermined area including at least two pixels, determining a main color of the at least two pixels as the color of the predetermined area; and in response to three values of RBG (red, blue, green) values of a color formed by superimposing colors of all predetermined areas being equal, updating the color of each predetermined area as a main color of the target object.

13. The device of claim 8, wherein the superimposing the target color at the target position to achieve rendering comprises:

superimposing the target color with different transparency to the target position.

14. The device of claim 13, wherein the superimposing the target color with different transparency at the target position comprises:

in response to the target position being a layer added between the level where the image is located and the level where the background of the image is located, the number of layers added being two, and each layer added being divided into a first area from a top of the background to a top of the image, a second area from the top of the image to a center axis of the image, and a third area from the center axis of the image to the bottom of the image;

in the two layers added, superimposing a second target color with a third opacity on the first and second areas corresponding to a bottom layer, the second target color being obtained by adjusting the saturation and the brightness of the second color; superimposing the second target color on the third area corresponding to the bottom layer, wherein the opacity of the second target color gradually changes from a fourth opacity to the third opacity from the bottom of the image to the center axis of the image in the third area corresponding to the bottom layer, the fourth opacity being less than the third opacity; and in the two layers added, superimposing a first target color with an opacity gradually changing from a fifth opacity to a sixth opacity from the top of the background to the top of the image in the first area corresponding to a top layer, the first target color being obtained by adjusting the saturation and the brightness of the first color, the fifth opacity being greater than the sixth opacity, superimposing the first target color with the sixth opacity in the second and third areas corresponding to the top layer.

15. A non-transitory computer-readable medium, storing a computer program which, when executed by a processing means, performs a method for rendering, the method comprises:

determining colors of a plurality of predetermined areas on a target object, the number of the predetermined areas being at least a predetermined number, which is greater than 1;

determining a target color to be superimposed to a target position according to a color of each predetermined area in the plurality of predetermined areas, comprising:

superimposing the color of each predetermined area with a first opacity on white to obtain a first color; and adjusting a saturation of the first color to a saturation threshold range, and adjusting a brightness of the first color after adjusting the saturation to a brightness threshold range to obtain the target color;

superimposing the color of each predetermined area with a second opacity on white to obtain a second color; and adjusting a saturation of the second color to the saturation threshold range, and adjusting a brightness of the second color after adjusting the saturation to the brightness threshold range to obtain the target color; wherein the second opacity is greater than the first opacity, the difference between the second opacity and the first opacity is a predetermined value, the second opacity is less than or equal to a first value, the first opacity is greater than or equal to a second value, and the first value is greater than the second value; and superimposing the target color at the target position to achieve rendering.

* * * * *